April 30, 1940.  M. BALZ  2,199,063
SHOCK ABSORBER ASSEMBLY, ESPECIALLY FOR MOTOR VEHICLES
Filed May 10, 1938   2 Sheets-Sheet 1
Fig. 1.
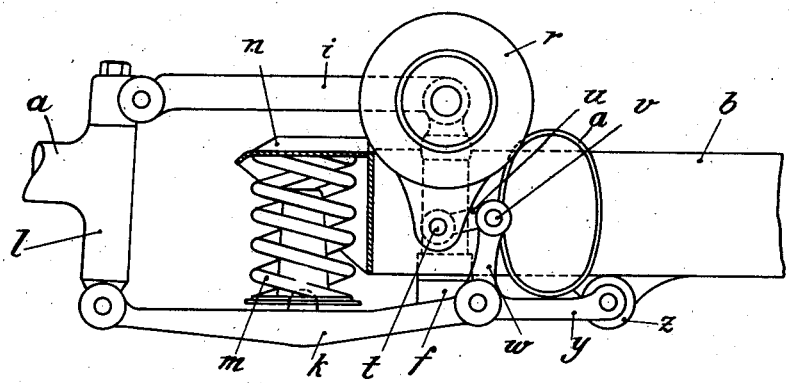
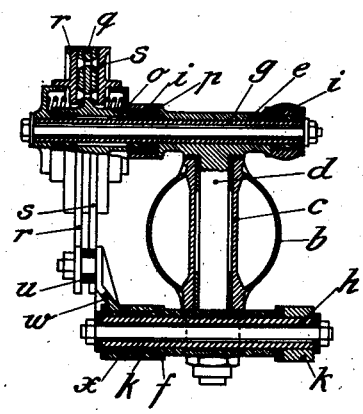
Fig. 2.
Inventor:
Max Balz
By *Attorney*
his Atty.

April 30, 1940.  M. BALZ  2,199,063

SHOCK ABSORBER ASSEMBLY, ESPECIALLY FOR MOTOR VEHICLES

Filed May 10, 1938  2 Sheets-Sheet 2

Inventor:
Max Balz
By Otto Munk
his Atty.

Patented Apr. 30, 1940

2,199,063

UNITED STATES PATENT OFFICE 2,199,063

SHOCK ABSORBER ASSEMBLY, ESPECIALLY FOR MOTOR VEHICLES

Max Balz, Esslingen, Germany, assignor to Daimler - Benz Aktiengesellschaft, Stuttgart-Unterturkheim, Germany Application May 10, 1938, Serial No. 207,007
In Germany May 10, 1937

11 Claims. (Cl. 267—20)

This invention relates to an arrangement of shock absorbers, which are mounted on a pivot axle on the frame of a motor vehicle or on parts rigidly connected with the frame, especially for independently suspended wheels of motor vehicles.

The invention starts from the idea, that the action of a shock absorber is the more favourable the greater the relative stroke of the mutually movable parts exerting the absorption, hereinafter described briefly as "shock absorber halves," is. The shock absorber can in this instance be adjusted relatively soft. This adjusting possibility presents the advantage that the shock absorber responds with certainty even in the case of small movements of the wheel and is less sensitive to inaccuracies in manufacture and adjustment. The springing properties of the vehicle in the case of soft adjusted shock absorbers are generally more favourable than in the case of short-stroked, hard adjusted absorbers.

For improving the shock absorbing properties and for preventing the disadvantages of short-stroke, hard adjusted shock absorbers the invention provides such a connection of the shock absorber halves with the parts participating in the oscillating movements of the wheel, that these halves carry out oppositely directed movements. Such parts are, e. g., the links or a reversing rod system. On vehicles in which the wheel is guided by means of two guide links arranged one above the other and forming a four-sided link system, this connection can be effected in a particularly simple manner in that one of the shock absorber halves is connected to one of the two guide links of the wheel arranged one above the other, in such a manner that this half is moved by this link in the direction in which the links swing, whereas the other shock absorber half is moved in the opposite direction by the other guide link through the intermediary of a reversing rod system. Consequently, the two absorber halves not only carry out an ordinary relative counter-movement but a larger counter-movement, so that the angle of rotation of the two absorber halves is much greater than a mere relative movement. This circumstance is particularly important for vehicles such as racing cars, in which both a short stroke hard spring suspension and at the same time a very accurate adjustment of the shock absorber with relatively large damping effect is desirable.

Furthermore, in the case of a suspension of the wheel on an intermediate member for example constructed as a pivot pin yieldably oscillatable about a vertical pivot axle on the frame, the invention provides the arrangement of the shock absorber on this intermediate member. Thus, in spite of the yieldable mounting of the guide links of the wheel, a simple operation of the shock absorber is rendered possible. This applies particularly, when the yieldably mounted intermediate member is constructed as a common bearing carrier for the two guide links forming a four-sided link system and one shock absorber half is coupled with one link and the other shock absorber half with the other link.

According to a preferred form of the invention two shock absorbers are used.

The invention therefore provides furthermore a spring-suspension, especially for independently suspended wheels of motor vehicles spring supported by means of frictionless springs, and in which for each wheel two shock absorbers with enlarged relative movement of the halves as described above are employed, one of the shock absorbers exerts a substantially constant absorbing effect and the other a variable absorbing effect for example dependent upon the displacement or upon the displacement speed. One of these two shock absorbers is preferably a friction shock absorber and the other a hydraulic shock absorber. The two shock absorbers are generally connected in parallel and preferably separately adjustable. Each of the two shock absorbers or both may be suspended in the manner described above for one shock absorber.

By this combination of two shock absorbers it is possible to adjust for the actually most favourable absorption. For example the friction shock absorber need be only relatively slightly tightened as required, whereas the main absorption can be effected by the hydraulic shock absorber. This latter preferably operates in such a manner that it exerts an absorbing action only during the downward movement of the wheel or sometimes in the case of larger oscillations of the wheel in upward or downward direction.

Embodiments of the invention are illustrated by way of example in the accompanying drawings, in which—

Fig. 1 shows the wheel suspension in side elevation and

Fig. 2 in cross-section.

Figure 3:
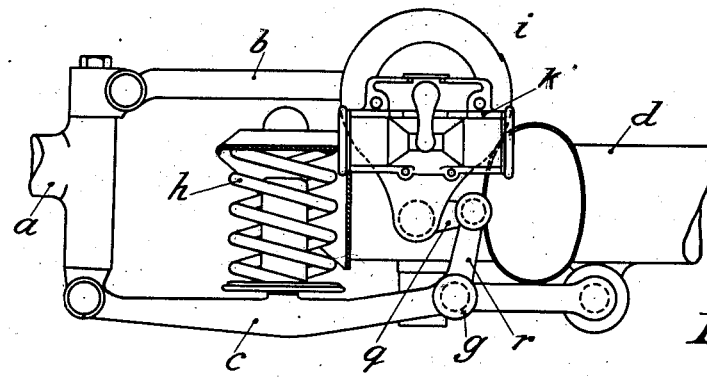
Fig. 3 is a diagrammatic elevation of a spring suspension with a hydraulic and a friction shock absorber.
Figure 4:
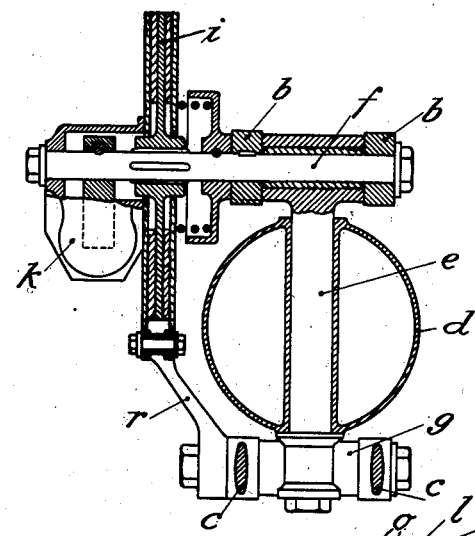
Fig. 4 is a diagrammatic section through the axis of the shock absorber aggregate.

In the form of construction illustrated a designate a longitudinal member of the chassis through which a tubular cross member b extends the two members being rigidly connected by welding. In a sleeve c (Fig. 2) a vertical pivot pin d is mounted, the upper end of which has a cross-piece e constructed as a bearing. Another cross piece f is fixed on the lower end of the pivot pin d. Bearing pins g and h are fixed one in each of the two cross pieces e and f. These pins g, h project both from the ends of their cross pieces, and the bifurcated guide links i and k for guiding the wheel carrier l are freely rotatable on these pins. An unguided helical spring m (Fig. 1) serves for resiliently supporting the wheel, the lower end of the spring resting on the lower link and its upper end bears against a bracket n welded on the end face of the cross member b.

The shock absorber is, according to the invention, constructed as a frictional absorber. On one end, preferably of the upper pin g (Fig. 2) the shock absorber hub o is mounted and coupled with the upper guide link i by means of keys p. The hub o carries a friction disc q which is arranged between two other discs r and s and held in frictional contact therewith by spring pressure. The friction discs r and s are connected to a link or to an intermediate strap u by means of a pin t (Fig. 1), this strap having a pin v which engages in a lever w mounted on the outer end of pin h (Fig. 2) and coupled with the lower guide link k for example by means of claws x.

The lower cross piece f of the pivot pin d has an inwardly extending bifurcated arm y (Fig. 1), which bears in known manner against rubber buffers z mounted on the chassis. Thus a turning of the pivot pin and consequently of the entire wheel suspension about the axis of the pivot pin is only possible to an extent corresponding to the elasticity of the rubber buffers z.

The shock absorber operates in the following manner: In the event of the wheel and consequently the links i and k swinging upwards, the hub o will be moved, with the friction disc q forming one half of the shock absorber, in the direction in which the links swing, that is according to Fig. 1 in clockwise direction. At the same time the lever w is turned about the axis of the pin h also in clockwise direction, with the result that the friction discs r and s, which form the other shock absorber half, are turned in the opposite direction about the axis of the pin g or of the shock absorber through the intermediary of the link u. The turning movements of the two shock absorber halves consequently sum up, so that a more accurate adjustment and a more effective operation of the shock absorber becomes possible.

As can be seen, the whole shock absorber aggregate, including the lever w and the intermediate rod system, can be easily removed laterally without it being necessary to dismantle the pivot pin or the links. This, because the shock absorber and the connecting parts to the shock absorber are mounted on one side of the assembly. As both the shock absorber proper and also the lever w controlling the shock absorber form parts of an assembly which is yieldably oscillatable as a whole about the axis of the pivot pin d, and consequently no relative movement occurs between the shock absorber and the lever w owing to the yieldable mounting, the intermediate rod system can be made very simple.

Instead of suspending the guide links on a bearing piece yieldably oscillatable about a vertical pivot axle, an arrangement may be provided in which the guide links themselves are separately and yieldably mounted on the chassis in bearings rigidly connected with the chassis.

Furthermore, the invention is not confined to friction shock absorbers, but is applicable to all types of shock absorbers, especially to hydraulic shock absorbers, which require particularly accurate adjustment and in which a soft adjustment is particularly important for the good operation of the shock absorber. The invention is also applicable to shock absorbers which are actuated by shifting the two halves (for example a cylinder and a piston) instead of by turning the two shock absorber halves. In this instance the cylinder for example may be connected to one of the guide links outside its point of articulation or to a corresponding lever of the guide link. The invention is furthermore not only applicable for the guiding of a wheel by means of two links arranged one above the other but can be used on any wheel guiding systems, the actuation of the shock absorber halves being, if necessary, derived from the same guide lever, provided, provision is made, for example by means of an intermediate lever, that the movement of the one shock absorber half receives an additional direction relatively to the movement of the other shock absorber half.

The steerable wheel-bearing a (Fig. 3), for example, is guided substantially parallel by the two bifurcated links b and c, which are hingedly connected by means of transverse pins f and g to a pivot pin e mounted on the chassis d and slightly yieldable about its vertical axis. The spring supporting of the wheel is effected by an unguided frictionless helical spring h, which bears at one end against the lower link and at the other end against a bracket welded on to the chassis. A friction shock absorber i and a hydraulic shock absorber k connected in parallel therewith are provided for the shock absorption.

Figure 5:
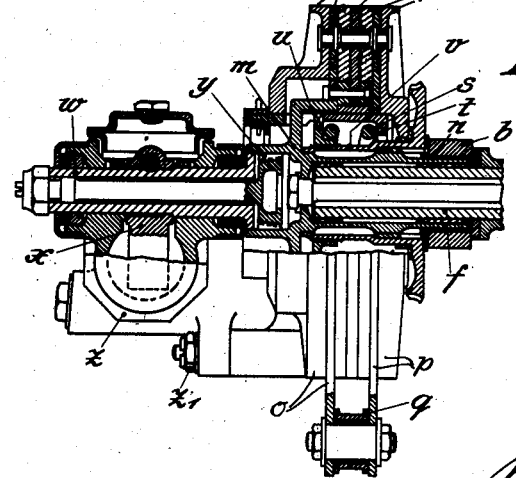
Fig. 5 shows a constructional design of the shock absorber assembly partly in elevation and partly in section.

For this purpose, as particularly Fig. 5 shows, the inner half of the friction shock absorber formed by the friction disc l and hub m, is coupled with one arm of the upper link b by means of claws or keys n, whereas the outer friction discs o and p of the friction shock absorber, which at the same time constitute the outer casing-like shock absorber half, are connected by a pin to an intermediate strap q which in turn is hingedly connected to a lever r of the lower link c. A spring s presses the two friction discs o and p against the middle friction disc l and for this purpose bears against two abutments t and u, the abutment t extending with clearance through apertures in the hub m which is rigidly connected with the disc o, whereas the abutment u is coupled in the direction of rotation with the abutment t and screwed on to a sleeve v by means of a screw thread. This sleeve can be rotated from the outer side by means of a rack to regulate the tension of the spring s.

Furthermore, the inner half of the hydraulic shock absorber, that is the shaft w with the lever x actuating the pistons, is coupled by claws y with the hub m, whereas the casing z forming the outer shock absorber half is rigidly connected to the outer friction disc o of the friction shock absorber by bolts z₁. The hydraulic shock absorber can advantageously be adjusted in the usual manner, for example by changing the throttle area between the different piston sides, whereby the absorption in one direction (for example the downward movement of the wheel) may be greater than in the other direction.

In the case of an upward displacement of the wheel or the link b the inner half of the friction shock absorber m, l and the inner half of the hydraulic shock absorber w, x are shifted in one direction of rotation (in Fig. 3 in clockwise direction) whereas the outer halves o, p and z respectively of the shock absorber are moved in the opposite direction by the lower link c, the lever r and the intermediate strap q. By appropriately adjusting the shock absorbers the action of the one or the other can be intensified or weakened to attain the degree of shock absorption actually required.

Having now particularly described and ascertained the nature of my said invention and in what manner the same is to be performed, I declare that what I claim is:

1. In a wheeled vehicle, the combination with a chassis, of a wheel carrying member, an intermediate mechanical linkage permitting up and down motion of the said wheel member relative to the chassis, shock absorbing means disposed on said chassis and having two members arranged for movement in opposite directions, and means interconnecting the linkage and said members to move both said members relative to the chassis in opposite directions to one another from up and down motion of the wheel carrying member.

2. In a wheeled vehicle, the combination with a chassis, of a wheel carrying member, an intermediate mechanical linkage permitting up and down motion of the said wheel member relative to the chassis, shock absorbing means disposed on said chassis and having two members arranged for movement in opposite directions, and motion translation means interconnecting the linkage and said members to move both said members relative to the chassis in opposite directions to one another with up and down motion of the wheel carrying member.

3. In a wheeled vehicle, the combination with a chassis, of a wheel carrying member and an intermediate mechanical linkage including links pivotally connecting the chassis and wheel carrying member and moved to mutually related planes by up and down motion of the wheel carrying member, shock absorbing means having members arranged for movement in opposite directions, one of the links moving one member in one direction relative to the chassis and another of said links moving another member in the opposite direction relative to the chassis upon up or down motion of said wheel carrying member.

4. In a wheeled vehicle, the combination with a chassis, of a wheel carrying member and an intermediate mechanical linkage including links pivotally connecting the chassis and wheel carrying member and moving in mutually related planes one above another on up and down motion of the wheel carrying member, shock absorbing means having members arranged for movement in opposite directions one of said links connected for directly moving one member relative to the chassis and another of said links connected for indirectly moving another member relative to the chassis and in an opposite direction to the first upon up or down motion of said wheel carrying member.

5. In a wheeled vehicle, the combination with a chassis, of a wheel carrying member and an intermediate mechanical linkage permitting up and down motion of the said wheel member relative to the chassis, a plurality of shock absorbers associated with the chassis and having operating members movable relative to the chassis and oppositely to one another from said linkage upon up and down motion of said wheel carrying member.

6. In a wheeled vehicle, the combination with a chassis, of a wheel carying member and an intermediate mechanical linkage permitting up and down motion of the said wheel member relative to the chassis, a plurality of shock absorbers associated with the chassis and having operating members movable relative to the chassis and oppositely on a common axis element, and means connecting said linkage to said operating members to move the said operating members oppositely upon up and down motion of said wheel carrying member.

7. In a wheeled vehicle, the combination with a chassis, of a wheel carrying member and an intermediate mechanical linkage permitting up and down motion of said wheel member relative to the chassis, a frictionless resilient element influencing the motion between chassis and wheel carrying member, and shock absorbing means having members arranged for movement relative to the chassis in opposite directions, and means interconnecting the linkage and said members to move one oppositely to another from up and down motion of the wheel carrying member.

8. In a wheeled vehicle, the combination claimed in claim 5, in which at least one of said shock absorbers is formed as a frictional shock absorber and a second one is formed as a hydraulic shock absorber.

9. In a wheeled vehicle, the combination with a chassis, of a wheel carrying member and an intermediate linkage including two links pivotally connecting the chassis and wheel carrying member and moving in mutually related planes one above the other upon up and down motion of the wheel carrying member, shock absorbing means including two parts arranged for rotation relative to the chassis and in opposite directions to one another about an axis coinciding with the pivot axis of one of said links, a shaft extending in said axis and participating in the pivotal movements of the link pivoting about said axis, one of said shock absorber parts being keyed to said shaft, the other part being loose on said shaft and coupled to the other link.

10. In a wheeled vehicle, the combination with a chassis, of a support element movably mounted on said chassis, a wheel carrying member, an intermediate linkage connecting said wheel carrying member to said support element for up and down motion of said wheel carrying member relative to the support element, shock absorbing means disposed on said support element and having two members arranged for movement in opposite directions, means interconnecting the linkage and said members to move both said linkage and said members relative to the support element in opposite directions to one another from up and down motion of the wheel carrying member and means including an elastic abutment to normally hold said support element in a predetermined position relative to the chassis.

11. In a vehicle, the combination with a chassis, of a wheel carrying member and guide means for said wheel carrying member permitting up and down motion of the latter relative to the chassis, a frictional shock absorber including two parts rotatable against one another about an axis, a hydraulic shock absorber including two parts rotatable against one another about an axis of said frictional shock coinciding with the axis of said frictional shock absorber, and means to actuate both said shock absorbers simultaneously from the up and down movement of said wheel carrying member.

MAX BALZ.